US007350956B2

(12) United States Patent
Sakaki (10) Patent No.: US 7,350,956 B2
(45) Date of Patent: Apr. 1, 2008

(54) BACKLIGHT UNIT AND LIQUID-CRYSTAL DISPLAY DEVICE USING THE SAME

(75) Inventor: Yoshinobu Sakaki, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 214 days.

(21) Appl. No.: 11/345,306

(22) Filed: Feb. 2, 2006

(65) Prior Publication Data

US 2006/0171166 A1 Aug. 3, 2006

(30) Foreign Application Priority Data

Feb. 3, 2005 (JP) ............... 2005-027909

(51) Int. Cl.
*F21V 23/00* (2006.01)
(52) U.S. Cl. ............... 362/614; 362/630; 362/260
(58) Field of Classification Search ............... 362/614, 362/630, 260, 221; 349/70; 313/493, 49, 313/331, 318.02
See application file for complete search history.

(56) References Cited

U.S. PATENT DOCUMENTS

RE35,142 E * 1/1996 Kikuchi et al. ............. 313/594
6,168,289 B1 * 1/2001 Shah ........................... 362/221
6,568,831 B2 * 5/2003 Ono et al. ................... 362/221
7,048,410 B2 * 5/2006 Kutler ......................... 362/218
2003/0202347 A1 * 10/2003 Chelf et al. ................. 362/225
2006/0007706 A1 * 1/2006 Chen et al. .................. 362/614

FOREIGN PATENT DOCUMENTS

JP 9-55112 2/1997

* cited by examiner

*Primary Examiner*—Stephen F. Husar
*Assistant Examiner*—Peggy A. Neils
(74) *Attorney, Agent, or Firm*—McGinn IP Law Group, PLLC

(57) ABSTRACT

A backlight unit prevents the display quality degradation of a LCD device and improves the long-term reliability thereof. The unit comprises at least one fluorescent lamp having a first end and a second end; a first cable or wire connected to the first end of the lamp; and a second cable or wire connected to the second end of the lamp. The first cable or wire is different in shape or type from the second cable or wire. A conductor of the first cable or wire is approximately equal in cross-sectional area to that of the second cable or wire. When two or more fluorescent lamps are used, a cross-sectional area of the conductor of the first cable connected commonly to the first ends of the lamps is approximately equal to the sum of cross-sectional areas of the conductors of the second cables or wires connected respectively to the second ends thereof.

9 Claims, 5 Drawing Sheets

BACKLIGHT UNIT AND LIQUID-CRYSTAL DISPLAY DEVICE USING THE SAME

BACKGROUND OF THE INVENTION

1. Field of the Invention

The present invention relates to a Liquid-Crystal Display (LCD) device and more particularly, to the structure of a backlight unit of a LCD device.

2. Description of the Related Art

The LCD device has been extensively used as a monitor of the so-called Office Automation (OA) apparatus, audio-visual (AV) apparatus, mobile terminal device, and so on. This is because the LCD device has preferable characters such as compactness, thinness, and low power-consumption.

The LCD device is divided into several types according to the illumination structure, such as the direct illumination type, and the edge light type. The edge-Light type LCD device comprises, for example, a backlight unit having a fluorescent lamp or lamps as the backlight source, a reflector, a light guide plate, a reflection sheet, and so on; an optical sheet for generating uniform illumination light from the backlight; a LCD panel having a pair of opposing transparent substrates and a liquid crystal layer interposed between the substrates; a casing for receiving and fixing these members; and various substrates held by the casing.

As the fluorescent lamp for the backlight unit, generally, a discharge tube containing a gaseous mixture of mercury (Hg), argon (Ar), and neon (Ne) gases is used. With this tube, mercury atoms existing in the tube are ionized by excitation due to discharge to emit ultraviolet (UV) rays. The UV rays thus emitted are irradiated to the fluorescent material coated on the inner wall of the tube, thereby exciting the material. Thus, visible light is emitted toward outside through the wall of the tube, turning the said tube on.

While the fluorescent lamp is discharging, heat is generated at the pair of electrodes (i.e., the anode and the cathode) located in the tube at its each end due to electrical loss and as a result, the lamp has a temperature distribution such that the temperature is the highest at its ends. The heat generated at the electrodes will flow or dissipate to the outside due to thermal conduction by way of the glass that forms the valve of the lamp and the conductors of the cables or wires that are connected to the electrodes.

Figure 1:
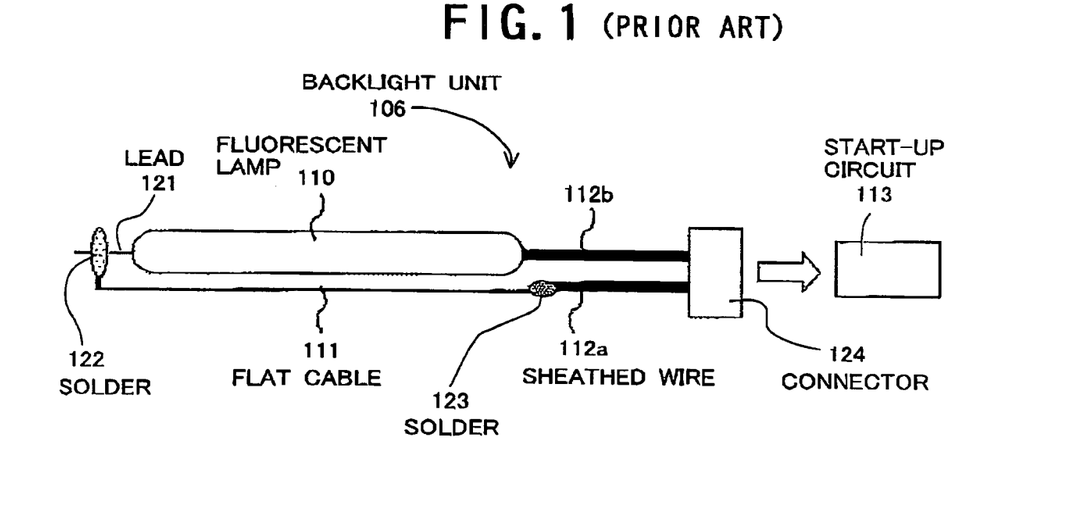
FIG. 1 is a schematic view showing the connection structure of the fluorescent lamp of a prior-art backlight unit for the edge-light type LCD device.

FIG. 1 schematically shows the connection structure of the fluorescent lamp of a conventional backlight unit for the edge-light type LCD device. As seen from FIG. 1, the conventional backlight unit 106 comprises a fluorescent lamp 110, a flat cable 111, and two sheathed wires 112a and 112b. One end of the flat cable 111 is connected to one end of the lamp 110 by way of a lead 121 of the lamp 110 with a solder 122. The other end of the flat cable 111 is connected to one end of the sheathed wire 112a with a solder 123. The other end of the sheathed wire 112a is connected to a connector 124. One end of the sheathed wire 112b is connected to the other end of the lamp 110. The other end of the sheathed wire 112b is connected to the connector 124. The connector 124 is connected to a start-up circuit 113.

Figure 2:
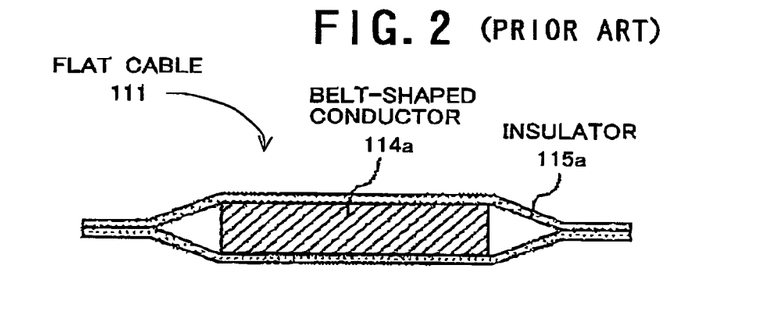
FIG. 2 is an enlarged, schematic cross-sectional view showing the structure of the flat cable used in the prior-art backlight unit of FIG. 1.

The flat cable 111 has the structure shown in FIG. 2, which comprises a belt- or tape-shaped conductor 114a and an insulator 115a covering entirely the conductor 114a. The insulator 115a is formed by a pair of insulating films located at each side of the conductor 114a. Both side edges of the insulating films are adhered to each other to confine the conductor 114a therein. The conductor 114a may be formed by adhering a patterned conductor foil or by printing a conductor film. The cable 111 may be bent in its thickness direction; however, it is difficult to be bent in its width direction.

Figure 3:
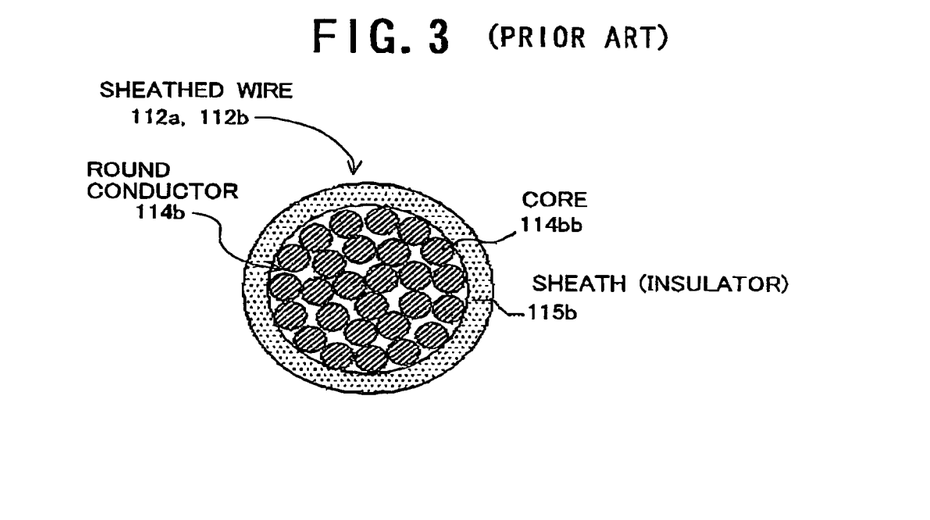
FIG. 3 is an enlarged, schematic cross-sectional view showing the structure of the sheathed wire used in the prior-art backlight unit of FIG. 1.

The sheathed wires 112a and 112b have the same structure as shown in FIG. 3, which comprises a round conductor 114b and a round sheath or insulator 115b covering entirely the conductor 114b. The conductor 114b is formed by a plurality of thread-shaped cores 114bb. The conductor 114b (i.e., the cores 114bb) is entirely covered with the sheath 115b. The sheath 115b is formed by a tube-shaped insulating resin.

The conductor 114a of the flat cable 111 is smaller in cross-sectional area than the conductor 114b of each of the sheathed wires 112a and 112b.

The above-described conventional backlight unit 106 is disclosed, for example, in the Japanese Non-examined Patent Publication No. 9-55112 published in 1997.

With the conventional backlight unit 106 shown in FIG. 1, the flat cable 111 and the sheathed wire 112b, which have different shapes or structures as shown in FIGS. 2 and 3, are respectively connected to the ends of the fluorescent lamp 110. Since the cross-sectional area of the conductor 114a of the cable 111 is smaller than that of the conductor 114b of the wire 112b, thermal conductivity difference arises between the cable 111 and the wire 112b. This means that the heat dissipation performance at the electrode of the lamp 110 to which the flat cable 111 is connected is less than that at the electrode of the lamp 110 to which the sheathed wire 112b is connected. As a result, the temperature at the electrode of the lamp 110 to which the flat cable 111 is connected will be higher than that at the electrode of the lamp 110 to which the sheathed wire 112b is connected during operation. In other words, the temperature of the lamp 110 will not be equal at its ends during operation. In summary, the cross-sectional area difference between the conductors 114a and 114b of the cable 111 and the wire 112b induces a difference of their heat dissipation performances, resulting in a temperature difference between the ends of the lamp 110.

Mercury gas confined in the fluorescent lamp 110 has the following property. Specifically, when temperature difference occurs between the ends of the lamp 110, mercury ions induced by discharge in the lamp 110 are likely to move toward the electrode with a relatively low temperature. Therefore, the mercury ions will deviate from their uniform distribution due to the temperature difference between the ends of the lamp 110, resulting in a mercury ion distribution where the density of the mercury ions in the vicinity of the electrode with a relatively low temperature is higher than that in the vicinity of the electrode with a relatively high temperature. Such the deviation of the mercury ion distribution as seen in the fluorescent lamp 110 is termed the "cataphoresis phenomenon".

Because of the above-described uneven distribution of the mercury ion in the lamp 110, normal discharge is unable to occur in the region of the lamp 110 where the mercury ion density is low (i.e. the mercury ions are thin). Instead, rare gas discharge will occur in the said region using the argon and neon ions confined in the lamp 110 along with the mercury ions. As a result, burnt orange light will be emitted and color unevenness will happen on the display screen of the LCD device after the operation or illumination of several thousands of hours.

For example, when the conductor 114a of the flat cable 111 has a cross-sectional area of 0.08 mm$^2$ and the conductor 114b of the sheathed wire 112b has a total cross-sectional area of 0.2 mm$^2$, a temperature difference $\Delta t$ between the ends of the lamp 110 will be 32° C. The temperature at the end of the lamp 110 to which the flat cable 111 (the cross-sectional area is relatively small) is connected is higher than that to which the sheathed wire 112b (the cross-sectional area is relatively large) is connected.

With the conventional backlight unit 106 of FIG. 1, as seen from the above explanation, the cable 111 and the wire 112b whose conductors 114a and 114b have different cross-sectional areas are respectively connected to the ends of the lamp 110. Therefore, the heat dissipation performance is not equal at the ends of the lamp 110 and thus, considerably large temperature difference will occur between these ends. Due to the temperature difference, the mercury ions in the lamp 110 are likely to move toward the end of a relatively low temperature to generate a deviation of the mercury ion distribution in the lamp 110. As a result, there is a problem that display quality degradation of the LCD device is caused by the color unevenness on the display screen and that the long-term reliability deterioration of the LCD device is caused by the operating life decrease of the lamp 100.

SUMMARY OF THE INVENTION

The present invention was created in consideration of the above-described problem.

A main object of the present invention is to provide a backlight unit that makes it possible to prevent the display quality degradation of a LCD device by suppressing abnormal emission of light of a fluorescent lamp or lamps and to improve the long-term reliability of a LCD device by prolonging the operating life of a fluorescent lamp or lamps, and a LCD device equipped with the unit.

The above object together with others not specifically mentioned will become clear to those skilled in the art from the following description.

According to a first aspect of the present invention, a backlight unit is provided, which comprises a fluorescent lamp having a first end and a second end as a light source; a first cable or wire (a first wiring line) connected to the first end of the lamp; and a second cable or wire (a second wiring line) connected to the second end of the lamp. The first cable or wire is different in shape or type from the second cable or wire. A conductor of the first cable or wire is approximately equal in cross-sectional area to a conductor of the second cable or wire.

With the backlight unit according to the first aspect of the present invention, the first cable or wire is connected to the first end of the fluorescent lamp and the second cable or wire is connected to the second end of the lamp. The first cable or wire is different in shape or type from the second cable or wire, and the conductor of the first cable or wire is approximately equal in cross-sectional area to the conductor of the second cable or wire. Therefore, the heat dissipation performances (i.e., the heat dissipation quantities) of the fluorescent lamp at the first and second ends are approximately equal to each other.

As a result, the temperature difference between the first and second ends of the lamp is suppressed within a permissible range. This means that the mercury ion distribution in the lamp and the resultant abnormal emission of light is restrained from deviating. Accordingly, the display quality degradation of a LCD device can be prevented.

Moreover, since abnormal emission of light is avoided, the inherent or intrinsic operating life of the fluorescent lamp can be optimized, which prolongs the operating life of the lamp. As a result, the long-term reliability of a LCD device can be improved.

In a preferred embodiment of the backlight unit according to the first aspect of the present invention, the conductor of the first cable or wire is approximately equal in cross-sectional area to the conductor of the second cable or wire in such a way that a temperature difference between the first end and the second end of the lamp is 10° C. or less.

In another preferred embodiment of the backlight unit according to the first aspect of the present invention, the first cable or wire is a flat cable with a belt-shaped conductor and the second cable or wire is a sheathed wire with a round conductor.

According to a second aspect of the present invention, another backlight unit is provided, which comprises fluorescent lamps each having a first end and a second end as a light source; a first cable or wire (a first wiring line) connected commonly to the first ends of the lamps; and second cables or wires (a second wiring line) connected respectively to the second ends of the lamps. The first cable or wire is different in shape or type from the second cables or wires. A cross-sectional area of a conductor of the first cable is approximately equal to a sum of cross-sectional areas of conductors of the second cables or wires.

With the backlight unit according to the second aspect of the present invention, the first cable or wire is connected commonly to the first ends of the fluorescent lamps and second cables or wires are connected respectively to the second ends of the lamps. The first cable or wire is different in shape or type from the second cables or wires. The cross-sectional area of the conductor of the first cable is approximately equal to the sum of the cross-sectional areas of the conductors of the second cables or wires.

Therefore, because of the same reason as the backlight unit according to the first aspect of the invention, the temperature difference between the first ends of the lamps and the second ends thereof is suppressed within a permissible range. This means that the mercury ion distribution in the lamp and the resultant abnormal emission of light is restrained from deviating. Accordingly, the display quality degradation of a LCD device can be prevented.

Moreover, since abnormal emission of light is avoided the inherent or intrinsic operating life of the fluorescent lamps can be optimized, which prolongs the operating life of each of the lamps. As a result, the long-term reliability of a LCD device can be improved.

In a preferred embodiment according to the second aspect of the present invention, the first cable or wire is different in shape or type from the second cables or wires.

In another preferred embodiment of the backlight unit according to the second aspect of the present invention, the cross-sectional area of the conductor of the first cable is approximately equal to the sum of the cross-sectional areas of the conductors of the second cables or wires in such a way that a temperature difference between the first ends of the lamp and the second ends thereof is 10° C. or less.

In still another preferred embodiment of the backlight unit according to the second aspect of the present invention, the first cable or wire is a flat cable with a belt-shaped conductor and each of the second cables or wires is a sheathed wire with a round conductor.

According to a third aspect of the present invention, a LCD device is provided, which comprises a LCD panel; and one of the backlight units as described above.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

First Embodiment

Figure 4:
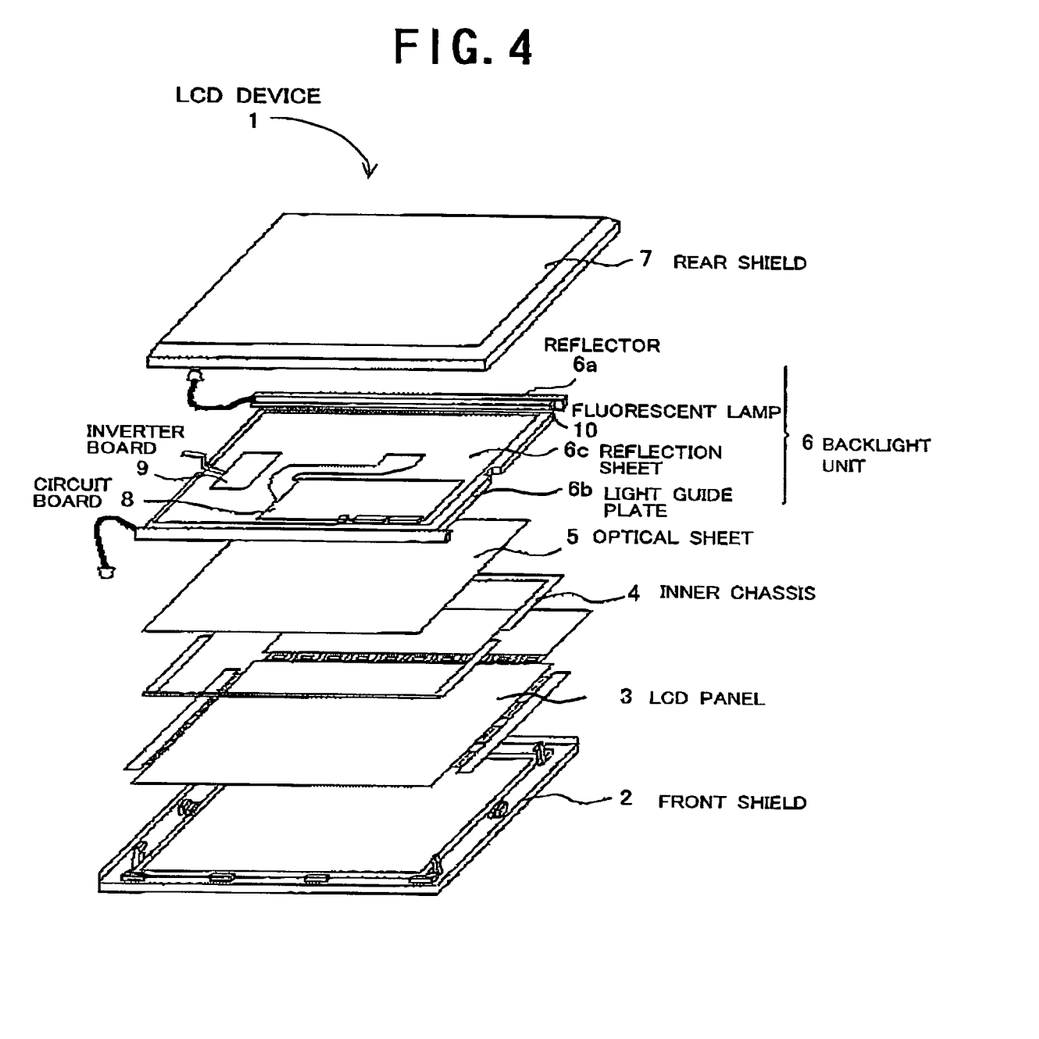
FIG. 4 is an exploded perspective view of an edge-light type LCD device including a backlight unit according to a first embodiment of the invention.

As explained in the BACKGROUND OF THE INVENTION, for example, an edge-light type LCD device 1 has the structure as shown in FIG. 4. Specifically, the LCD device 1 comprises a backlight unit 6 according to a first embodiment; an optical sheet 5; a LCD panel 3; a casing for holding and fixing these structural members; and circuit boards mounted on the back surface of the unit 6.

The backlight unit 6 has a fluorescent lamp 10 as a light source, a reflector 6a, a light guide plate 6b, and a reflection sheet 6c. The lamp 10 is located outside the light guide plate 6b to extend along one edge of the plate 6b. The reflector 6a is located outside the plate 6b to extend along the lamp 10 to cover the same. The reflection sheet 6c is superposed on the light guide plate 6b. The light emitted from the lamp 10 is reflected by the reflector 6a toward the light guide plate 6b. The light reflected by the reflector 6a is introduced into the light guide plate 6b and then, is reflected toward the LCD panel 3 by the reflection sheet 6c. The light emitted from the plate 6b is used as the backlight.

The optical sheet 5 generates uniform illumination light from the backlight emitted by the backlight unit 6. The uniform light thus generated is then illuminated to the LCD panel 3.

The LCD panel 3 has a pair of opposing substrates and a liquid crystal layer sandwiched by the pair of substrates.

As the members constituting the casing, a front shield 2, a rear shield 7, and an inner chassis 4 are shown in FIG. 4. The front shield 2 has a frame-like shape and covers the front of the device 1. The rear shield 7 has a plate-like shape and covers the rear of the device 1. The inner chassis 4 is used to fix the panel 3 at a predetermined position.

As the circuit boards, a circuit board 8 for driving the panel 3 and an inverter board 9 for driving the lamp 10 are shown in FIG. 4.

As the fluorescent lamp 10 of the backlight unit 6, a discharge tube containing mercury, argon, and neon gasses is used. The mercury ions, which are excited by discharge in the lamp 10, emit UV light. The UV light is irradiated to the fluorescent material coated on the inner wall of the lamp 10, thereby emitting visible light from the material. During discharge or operation of the lamp 10, heat is generated at the electrodes located at each end of the lamp 10 due to electrical loss. The heat is then dissipated toward the outside by way of the glass of the lamp 10 and the cables or wires connected to the electrodes.

Here, when the cables or wires connected to the electrodes of the lamp 10 are the same in shape or type and structure, the heat generated at the electrodes will be approximately equally conducted to the respective cables or wires and as a result, the temperature at the electrodes will be approximately equal. However, when different cables or wires are respectively connected to the electrodes of the lamp 10, in other words, for example, when a flat cable is connected to one of the electrodes and a round, sheathed wire is connected to the other, the flat cable and the sheathed wire will be considerably different in thermal conductivity. Therefore, the temperature at the electrodes (i.e., the temperature at the ends of the lamp 10) will be considerably unequal. In this case, the mercury ions existing in the lamp 10 are likely to move toward the electrode with a relatively low temperature, thereby making the distribution of the mercury ions in the lamp 10 non-uniform.

Accordingly, the mercury ions are thick near the electrode with a relatively low temperature and thin near the electrode with a relatively high temperature. In the region where the mercury ions are thin, normal discharge will not occur and rare gas discharge (i.e., abnormal discharge) will occur using the argon and neon ions confined in the lamp 110. Since the abnormal discharge emits burnt orange light, color unevenness will happen on the display screen of the LCD device 1.

Figure 5:
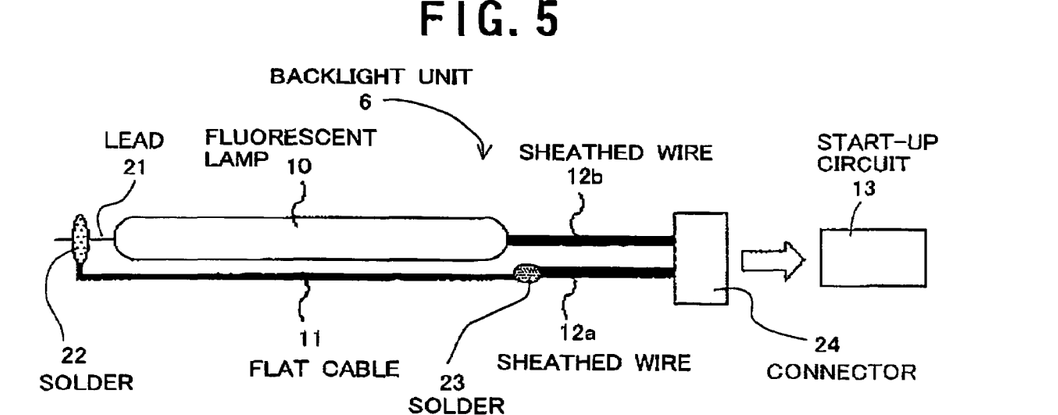
FIG. 5 is a schematic view showing the connection structure of the fluorescent lamp of the backlight unit according to the first embodiment of the invention.

Considering the above-described circumstances, the backlight unit 6 according to the first embodiment has the structure as shown in FIG. 5.

Specifically, the backlight unit 6 comprises a fluorescent lamp 10, a flat cable 11, and two sheathed wires 12a and 12b. One end of the flat cable 11 is connected to one end of the lamp 10 by way of a lead 21 of the lamp 10 with a solder 22. The other end of the flat cable 11 is connected to one end of the sheathed wire 12a with a solder 23. The other end of the sheathed wire 12a is connected to a connector 24. One end of the sheathed wire 12b is connected to the other end of the lamp 10. The other end of the sheathed wire 12b is connected to the connector 24. The connector 24 is connected to a start-up circuit 13.

Figure 6:
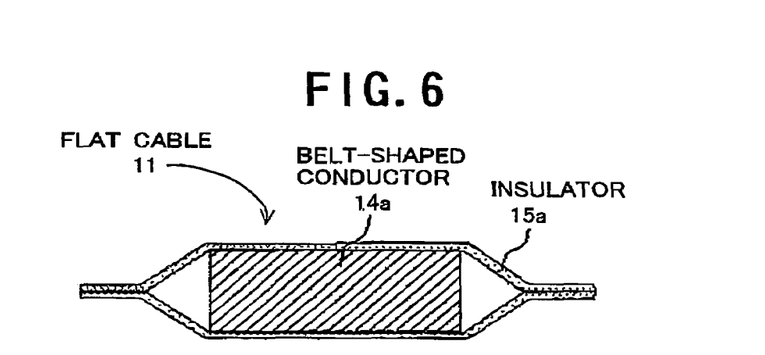
FIG. 6 is an enlarged, schematic cross-sectional view showing the structure of the flat cable used in the backlight unit according to the first embodiment of the invention.

The flat cable 11 has the structure shown in FIG. 6, which comprises a belt- or tape-shaped conductor 14a and an insulator 15a covering entirely the conductor 14a. The insulator 15a is formed by a pair of insulating films located at each side of the conductor 14a. Both side edges of the insulating films are adhered to each other to confine the conductor 14a therein. The conductor 14a may be formed by adhering a patterned conductor foil or by printing a conductor film. The cable 11 may be bent in its thickness direction; however, it is difficult to be bent in its width direction.

Figure 7:
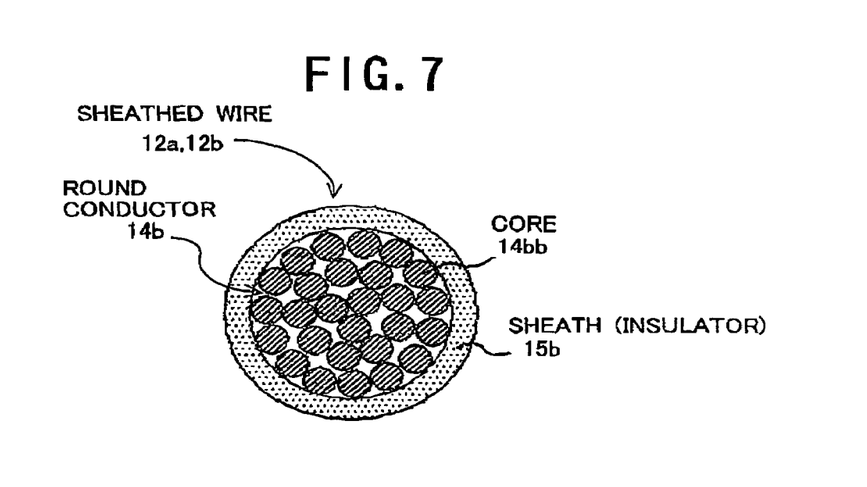
FIG. 7 is an enlarged, schematic cross-sectional view showing the structure of the sheathed wire used in the backlight unit according to the first embodiment of the invention.

The sheathed wires 12a and 12b have the same structure as shown in FIG. 7, which comprises a round conductor 14b and a round sheath or insulator 15b covering entirely the conductor 14b. The conductor 14b is formed by a plurality of thread-shaped cores 14bb. The conductor 14b (i.e., the cores 14bb) is entirely covered with the sheath 15b. The sheath 15b is formed by a tube-shaped insulating resin.

The above-described basic structure of the backlight unit 6 is the same as the previously-described prior-art backlight unit 106 shown in FIG. 1. However, unlike the prior-art unit 106, the cross-sectional area of the conductor 14a of the flat cable 11 and the cross-sectional area of the conductor 14b of the sheathed wire 12b are determined in such a way that the heat dissipation quantities or performances at the electrodes or ends of the lamp 10 are approximately equal. Concretely speaking, the conductor 14a of the cable 11 and the conductor 14b of the wire 12b are made of proper conductive metal (e.g., copper or copper alloy) having approximately equal thermal conductivities (i.e., approximately equal coefficients of thermal conductivity), respectively. When the effect of the length difference of the cable 11 and the wire 12b can be ignored, the cross-sectional area of the conductor 14a of the flat cable 11 and the cross-sectional area of the conductor 14b of the sheathed wire 12b are set to be approximately equal.

The wire 12a that connects the cable 11 to the connector 24 is the same as the wire 12b. However, the wire 12a may be different from the wire 12b.

When the backlight unit 6 having the above-described structure is turned on with the use of the start-up circuit 13, heat is generated at the electrodes located at the two ends of the fluorescent lamp 10. Then, the heat thus generated is dissipated to the outside by way of the cable 11 and the wire 12b (mainly the conductors 14a and 14b thereof) and the glass that forms the lamp 10 due to thermal conduction. Since the cable 11 and the wire 12b are formed in such a way that the heat dissipation quantities or performances at the two electrodes or ends of the lamp 10 are approximately equal, the heat generated at the electrodes is approximately equally conducted to the conductor 14a of the cable 11 and the conductor 14b of the wire 12b, respectively. As a result, the temperatures at the two electrodes are approximately equal.

For example, when the cross-sectional area of the conductor 14a of the flat cable 11 is 0.2 mm$^2$ and the cross-sectional area of the conductor 14b of the sheathed wire 12b is 0.2 mm$^2$, the temperature difference $\Delta t$ between the two ends of the lamp 10 is 2.5° C. This means that the temperatures at the two ends of the lamp 10 are approximately equal.

As seen from the above explanation, with the LCD device 1 having the fluorescent lamp 10 as a light source, the temperatures at the two ends of the lamp 10 can be approximately equalized and therefore, the display quality degradation induced by abnormal discharge of the lamp 10 can be restrained. Moreover, the inherent or intrinsic operating life of the lamp 10 can be optimized and therefore, the operating life of the lamp 10 is prolonged. As a result, the long-term reliability of the LCD device 1 can be improved.

In addition, it is unnecessary for the invention that the temperature difference $\Delta t$ between the two ends of the lamp 10 is zero or approximately zero. It is sufficient for the invention that the temperature difference $\Delta t$ is in a permissible range. Although the permissible range varies dependent on the layout of the lamp 10, the size of the LCD panel 3, and other heat-dissipating members built in the backlight unit 6, it is typical that the permissible range of the temperature difference $\Delta t$ is 10° C. or less, in which $\Delta t$ may be zero. Therefore, as long as the temperature difference $\Delta t$ is limited within the permissible range of 10° C. or less, the cross-sectional areas of the conductors 14a and 14b may be different.

To confirm the heat dissipation effect of the backlight unit 6 according to the first embodiment, the following test was carried out.

Specifically, the fluorescent lamp 10 had a length of 291 mm, an outer diameter of 2.0 mm, and an inner diameter of 1.6 mm. The insulator 15a of the flat cable 11 was made of polyimide or polyester films and the conductor 14a thereof was formed by a rolled, annealed copper wire. The insulator 15b of the sheathed wire 12b was made of cross-linked polyethylene and the conductor 14b thereof was formed by annealed copper wires, which was in accordance with the AWG (American Wire Gauge) #24 (i.e., #24AWG).

Figure 8:
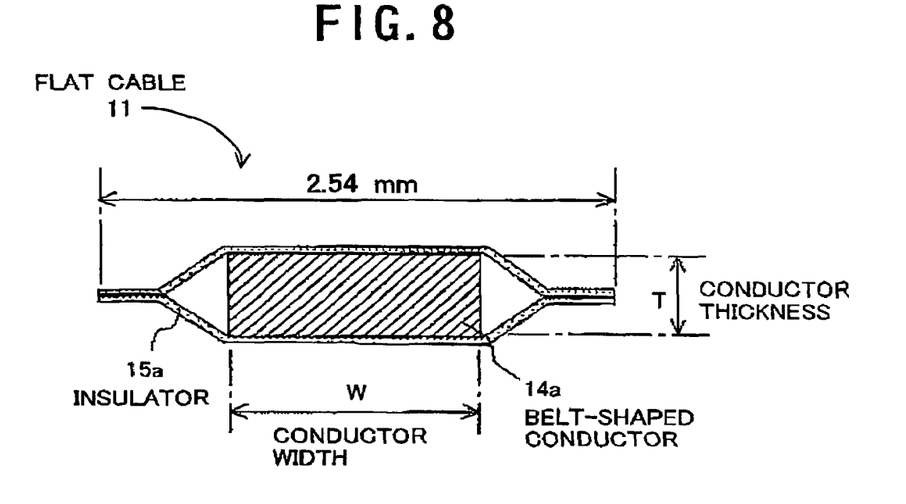
FIG. 8 is an enlarged, schematic cross-sectional view showing the width and thickness of the conductor of the flat cable used in the backlight unit according to the first embodiment of the invention.

The structures of the insulators and conductors of the flat cable and sheathed wires used in the prior-art backlight unit 106 and the backlight unit 6 according to the first embodiment of the invention are shown in Table 1 below. The conductor width W and the conductor thickness T of the flat cable are defined as shown in FIG. 8.

TABLE 1

| | FLAT CABLE | | | SHEATHED |
|---|---|---|---|---|
| ITEM | PRIOR-ART STRUCTURE | STRUCTURE 1 OF INVENTION | STRUCTURE 2 OF INVENTION | WIRE #24AWG |
| INSULATOR | POLYIMIDE FILM | POLYIMIDE FILM | POLYESTER FILM | CROSS-LINKED POLYETHYLENE |
| CONDUCTOR WIDTH (mm) | 0.800 | 1.340 | 1.340 | — |
| CONDUCTOR THICKNESS (mm) | 0.100 | 0.150 | 0.150 | — |
| CONDUCTOR CROSS-SECTION (mm$^2$) | 0.080 | 0.201 | 0.201 | 0.2 |

TABLE 1-continued

| | FLAT CABLE | | | SHEATHED |
| --- | --- | --- | --- | --- |
| ITEM | PRIOR-ART STRUCTURE | STRUCTURE 1 OF INVENTION | STRUCTURE 2 OF INVENTION | WIRE #24AWG |
| INSULATOR THICKNESS (μm) | 25 | 25 | 25 | — |

An electric power was supplied to the backlight unit 6 or 106 with the start-up circuit 13 or 113 to turn the lamp 10 or 110 on in such as way that an alternating electric current of 5 mA (rms) flowed through the lamp 10 or 110. Then, the surface temperatures of the lamp 10 or 110 at its two electrodes inserted into the ends thereof were measured. The result of this measurement is shown in Table 2 below.

TABLE 2

| MEASURING POINT | PRIOR-ART STRUCTURE | STRUCTURE 1 OF INVENTION | STRUCTURE 2 OF INVENTION |
| --- | --- | --- | --- |
| ELECTRODE WITH RELATIVELY LOW TEMPERATURE (° C.) | 129.0 | 86.0 | 96.5 |
| ELECTRODE WITH RELATIVELY HIGH TEMPERATURE (° C.) | 97.0 | 83.5 | 91.0 |
| ATMOSPHERE TEMPERATURE (° C.) | 20.5 | 22.0 | 22.0 |
| TEMPERATURE DIFFERENCE (° C.) | 32.0 | 2.5 | 5.5 |

As seen from Table 2, with the prior-art backlight unit 106 having considerably different cross-sectional areas of the conductors (the cross-sectional area of the conductor 114*a* of the flat cable 111 was 0.08 mm$^2$ and the cross-sectional area of the conductor 114*b* of the sheathed wire 112*b* was 0.2 mm$^2$), the temperature difference Δt between the two ends of the lamp 110 was 32.0° C. On the other hand, with the backlight unit 6 of the first embodiment of the invention having approximately equal cross-sectional areas of the conductors (the cross-sectional area of the conductor 14*a* of the flat cable 11 was 0.201 mm$^2$ and the cross-sectional area of the conductor 14*b* of the sheathed wire 12*b* was 0.2 mm$^2$), the temperature difference Δt between the two ends of the lamp 10 was 2.5° C. for the structure 1 and 5.5° C. for the structure 2. Thus, it was confirmed that the temperature difference Δt is limited within the permissible range of 10° C. or less.

Second Embodiment

Figure 9:
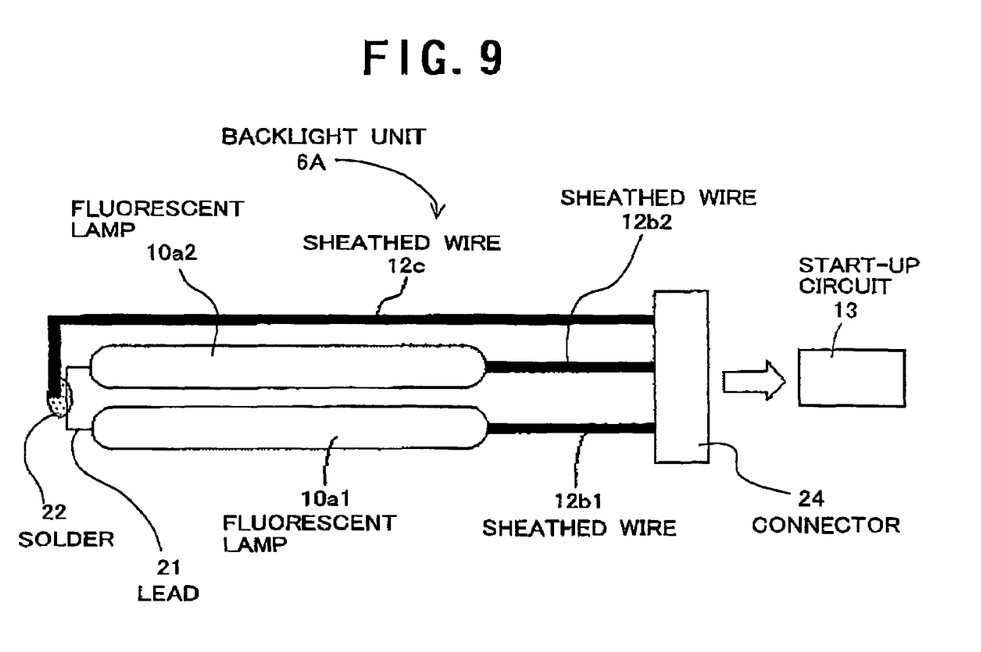
FIG. 9 is a schematic view showing the connection structure of the fluorescent lamps of a backlight unit according to a second embodiment of the invention

Next, a backlight unit 6A according to a second embodiment of the invention will be explained with reference to FIG. 9. FIG. 9 schematically shows the connection structure of two fluorescent lamps of the backlight unit 6A according to the second embodiment of the invention.

In the backlight unit 6 according to the first embodiment, the flat cable 11 and the sheathed wire 12*b* are respectively connected to the two ends of the fluorescent lamp 10. This means that if two or more fluorescent lamps are used for the backlight unit 6, the flat cable 11 and the sheathed wire 12*b* are respectively connected to the two ends of each of the fluorescent lamps.

On the other hand, in the backlight unit 6A according to the second embodiment, as shown in FIG. 9, two fluorescent lamps 10*a*1 and 10*a*2 are used in combination. A sheathed wire 12*b*1 is connected to one end of the fluorescent lamp 10*a*1 and a sheathed wire 12*b*2 is connected to one end of the fluorescent lamp 10*a*2. A sheathed wire 12*c* is commonly connected to the other end of the lamp 10*a*1 and that of the lamp 10*a*2 by way of a lead 21 and a solder 22. The wires 12*b*1, 12*b*2, and 12*c* have a similar structure to that of the wires 12*a* and 12*b* shown in FIG. 7, respectively.

In the connection structure of FIG. 9, if the wires 12*a*, 12*b*, and 12*c* are the same, the effective cross-sectional area of the conductor of the wire 12*c* (which is commonly connected to the lamps 10*a*1 and 10*a*2) is half (½) of the sum of the cross-sectional areas of the conductors of the wires 12*b*1 and 12*b*2 (which are respectively connected to the lamps 10*a*1 and 10*a*2). If the count of the fluorescent lamps is n, where n is an integer greater than unity, the ratio of the conductor cross section will be (1/n). Accordingly, heat dissipation quantities or performances will be unequal at the two ends of each of the lamps 10*a*1 and 10*a*2, thereby causing a considerably large temperature difference between the two ends of each of the lamps 10*a*1 and 10*a*2. This temperature difference makes the distribution of the mercury ions in the lamps 10*a*1 and 10*a*2 non-uniform. Therefore, abnormal emission of light will occur in the lamps 10*a*1 and 10*a*2.

Accordingly, in the backlight unit 6A according to the second embodiment of FIG. 9, the cross-sectional area of the conductor 14*b* of the wire 12*c* is determined in such a way that the heat dissipation quantity or performance of the wire 12*c* is approximately equal to the sum of the heat dissipation quantities or performances of the wires 12*b*1 and 12*b*2. Concretely speaking, the conductors of the wires 12*b*1 and 12b2 are made of proper conductive metal (e.g. copper or copper alloy) having an approximately equal thermal conductivity to that of the conductor of the wire 12c. When the effect of the length difference between the wire 12c and the wires 12b1 and 12b2 can be ignored, the cross-sectional area of the conductor of the wire 12c is set to be approximately equal to the sum of the cross-sectional areas of the conductors of the wires 12b1 and 12b2.

With the backlight unit 6A according to the second embodiment of the invention, similar to the first embodiment, the heat generated at the ends of the lamps 10a1 and 10a2 will be approximately equally conducted and dissipated to the conductors of the respective cables 12b1, 12b2, and 12c. Therefore, the temperature difference Δt between the two ends of each of the lamps 10a1 and 10a2 can be minimized. Accordingly, the display quality degradation induced by abnormal discharge of the lamps 10a1 and 10a2 can be restrained.

Moreover, the inherent or intrinsic operating life of the lamps 10a1 and 10a2 can be optimized and therefore, the operating life of the lamps 10a1 and 10a2 is prolonged. As a result, the long-term reliability of the LCD device 1 can be improved.

Third Embodiment

With the backlight unit 6A according to the above-described second embodiment of FIG. 9, the sheathed wires 12a1, 12a2, and 12c are the same in shape or type and structure. However, the sheathed wire 12c may be different in shape or type or structure from the sheathed wires 12a1 and 12a2, as shown in FIG. 10.

Figure 10:
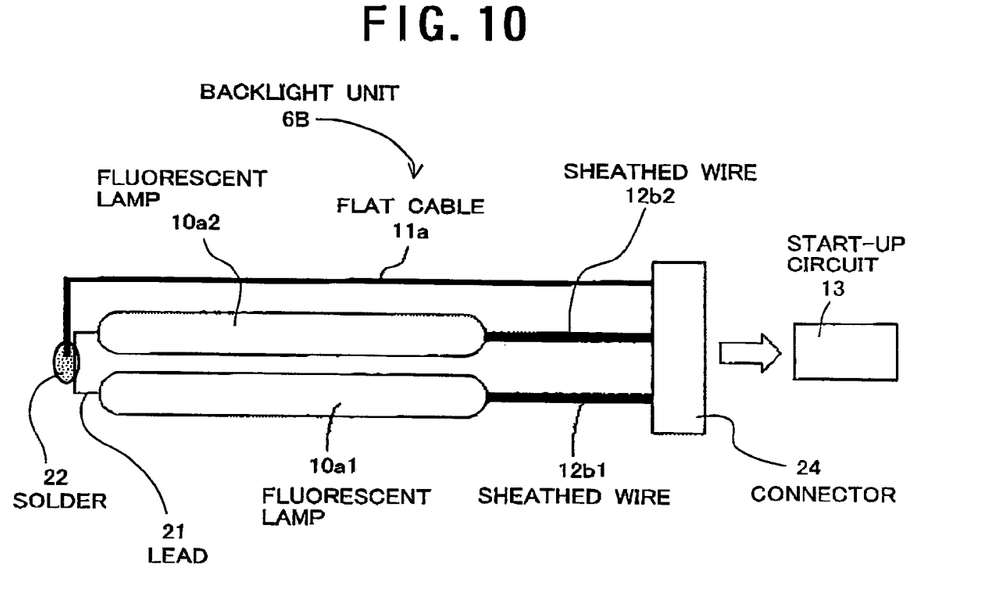
FIG. 10 is a schematic view showing the connection structure of the fluorescent lamps of a backlight unit according to a third embodiment of the invention.

FIG. 10 schematically shows the connection structure of two fluorescent lamps 10a1 and 10a2 of a backlight unit 6B according to a third embodiment of the invention.

In the backlight unit 6B according to the third embodiment, a flat cable 11a is used instead of the sheathed wire 12c. The cable 11a has a similar structure to the flat cable 12a or 12b shown in FIG. 6. The cross section of the conductor of the cable 11a is determined in such a way that the heat dissipation quantity or performance of the cable 11a is approximately equal to the sum of the heat dissipation quantities or performances of the wires 12b1 and 12b2. When the effect of the length difference between the cable 11a and the wires 12b1 and 12b2 can be ignored, the conductor cross section of the cable 11a is set to be approximately equal to the sum of the conductor cross sections of the wires 12b1 and 12b2.

Fourth Embodiment

Figure 11:
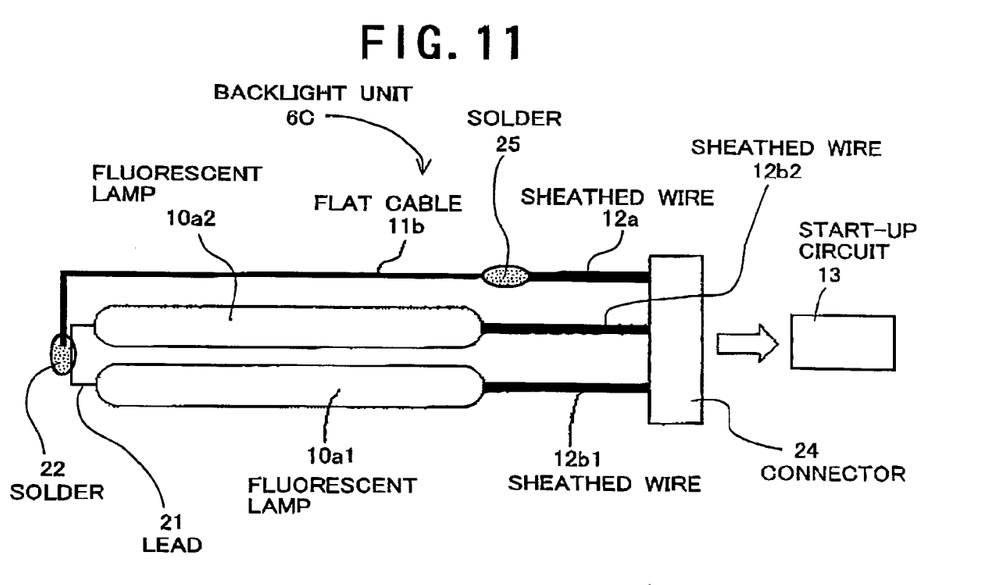
FIG. 11 is a schematic view showing the connection structure of the fluorescent lamps of a backlight unit according to a fourth embodiment of the invention.

FIG. 11 schematically shows the connection structure of two fluorescent lamps 10a1 and 10a2 of a backlight unit 6C according to a fourth embodiment of the invention In the backlight unit 6B according to the third embodiment, a flat cable 11a is used to connect the ends of the lamps 10a1 and 10a2 to the connector 24. In the unit 6C according to the fourth embodiment of FIG. 11, unlike this, a flat cable 11b and a sheathed wire 12a are used in combination to connect the commonly connected ends of the lamps 10a1 and 10a2 to the connector 24. The sheathed wire 12a is the same as used in the backlight unit 6 according to the first embodiment. The flat cable 11a and the sheathed wire 12a are interconnected to each other with a solder 25.

The cross-sectional area of the conductor of the cable 11b is determined in such a way that the heat dissipation quantity or performance of the cable 11b is approximately equal to the sum of the heat dissipation quantities or performances of the wires 12b1 and 12b2. When the effect of the length difference between the cable 11b and the wires 12b1 and 12b2 can be ignored, the cross-sectional area of the conductor of the cable 11b is set to be approximately equal to the sum of the cross-sectional areas of the conductors of the wires 12b1 and 12b2.

Other Embodiments

It is needless to say that the present invention is not limited to the above-described first to fourth embodiments. Any other modification is applicable to these embodiments.

For example, with the above-described first to fourth embodiments of the invention, the invention is applied to the edge-light type LCD device. However, the invention is applicable to any other type of the LCD device, such as the direct illumination type LCD device.

Moreover, a flat cable and/or a sheathed wire is/are used for the wiring or connection lines to the fluorescent lamp or lamps in the above embodiments. However, any other type of cables or wires may be used for this purpose.

The invention is applicable to any other display device or apparatus than the backlight unit of the LCD device if it comprises at least one lamp whose lighting state varies dependent on the temperature difference between the two ends of the lamp. Furthermore, the invention is applicable to any other heating element whose lighting state varies dependent on the temperature difference between the two ends of the element.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A backlight unit comprising:
   a fluorescent lamp having a first end and a second end as a light source;
   a first cable or wire connected to the first end of the lamp; and
   a second cable or wire connected to the second end of the lamp;
   wherein the first cable or wire is different in shape or type from the second cable or wire;
   and a conductor of the first cable or wire is approximately equal in cross-sectional area to a conductor of the second cable or wire.

2. The unit according to claim 1, wherein the conductor of the first cable or wire is approximately equal in cross-sectional area to the conductor of the second cable or wire in such a way that a temperature difference between the first end and the second end of the lamp is 10° C. or less.

3. The unit according to claim 1, wherein the first cable or wire is a flat cable with a belt-shaped conductor and the second cable or wire is a sheathed wire with a round conductor.

4. A backlight unit comprising:
   fluorescent lamps each having a first end and a second end as a light source;
   a first cable or wire connected commonly to the first ends of the lamps; and
   second cables or wires connected respectively to the second ends of the lamps;
   wherein the first cable or wire is different in shape or type from the second cables or wires;

and a cross-sectional area of a conductor of the first cable is approximately equal to a sum of cross-sectional areas of conductors of the second cables or wires.

5. The unit according to claim 4, wherein the first cable or wire is different in shape or type from the second cables or wires.

6. The unit according to claim 4, wherein the cross-sectional area of the conductor of the first cable is approximately equal to the sum of the cross-sectional areas of the conductors of the second cables or wires in such a way that a temperature difference between the first ends of the lamp and the second ends thereof is 10° C. or less.

7. The unit according to claim 4, wherein the first cable or wire is a flat cable with a belt-shaped conductor and each of the second cables or wires is a sheathed wire with a round conductor.

8. A liquid-crystal display device comprising:
a liquid-crystal display panel; and
the backlight unit according to claim 1.

9. A liquid-crystal display device comprising:
a liquid-crystal display panel; and
the backlight unit according to claim 4.

* * * * *